Dec. 23, 1947.  C. O. MORRIS  2,433,289
PIPE JOINT
Filed March 27, 1945  2 Sheets-Sheet 1
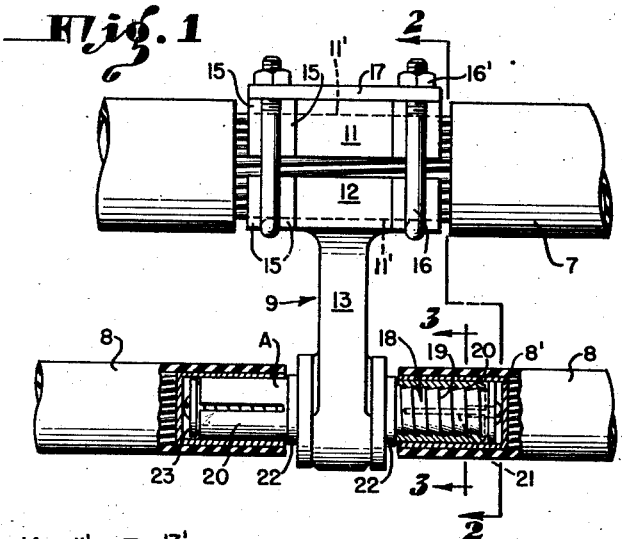
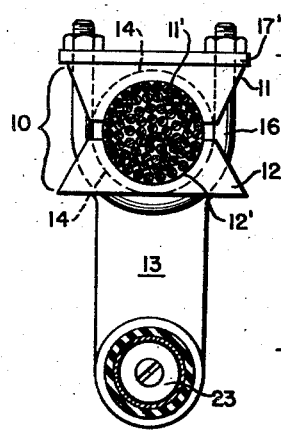
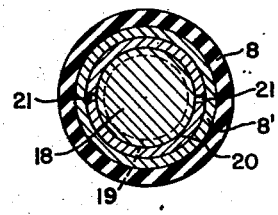
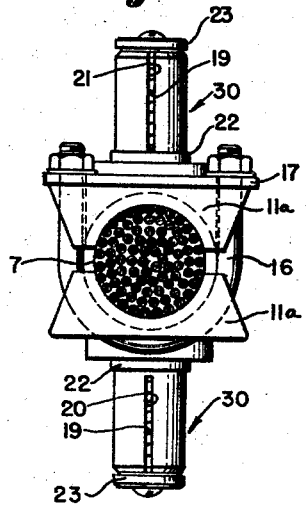
INVENTOR.
CHARLES O. MORRIS
BY
ATTORNEY Dec. 23, 1947.  C. O. MORRIS  2,433,289
PIPE JOINT
Filed March 27, 1945  2 Sheets-Sheet 2

*INVENTOR.*
CHARLES O. MORRIS
BY
ATTORNEY

Patented Dec. 23, 1947

2,433,289

UNITED STATES PATENT OFFICE 2,433,289

PIPE JOINT

Charles O. Morris, Van Nuys, Calif., assignor to The Garrett Corporation, Airesearch Manufacturing Company division, Los Angeles, Calif., a corporation of California Application March 27, 1945, Serial No. 585,129

10 Claims. (Cl. 285—108)

This invention relates to connecting devices and particularly to devices for disconnectibly connecting secondary conduits to primary conduits at points intermediate the ends of the primary conduit. More concretely considered, the invention deals especially with devices for connecting "take-off" conduits, either electrical or hydraulic, to a feeder, comprising either an electrical bus or an hydraulic main, at a "station" or take-off point along the length of the feeder.

It is an object of the invention to provide a connector of this general type which will be so constructed that it can be either temporarily or permanently clamped in place at any desired point on the primary conduit. The connector includes a construction adapted to enable take-off conduits or conductors to be quickly yet positively connected with the primary conduit, either in series or in parallel therewith, and as quickly and easily disconnected therefrom when desired.

It is also an object of this invention to provide a connector of this nature in which the secondary or take-off conduits, although quickly connectible and disconnectible from the device, will be constrained to engage and cooperate with means on the clamp portion of the device which will establish a full and complete contact therewith throughout every unit of area of the connected surfaces, to provide enhanced electrical contact for all the take-off members, as well as establishing a secure and strong connection thereof.

It is another object of the invention to provide a connector including a clamp for engaging the primary conduit in which corresponding parts of the clamp, including the take-offs, can be reversed and interchanged with each other, without requiring any alteration or any preparatory treatment of the parts, to enable repairs and replacements to be quickly made, thereby obviating time consuming interruptions in the operation of either the feeder line or the take-off lines.

A further feature of the invention resides in the fact that the secondary, or take-off, conduits can, instead of being merely temporarily plugged onto the device, be permanently locked to the connector body, itself established in a permanent location, by simply applying excess torque to the take-off conduit itself.

The other objects and advancements of the invention will be made manifest as this disclosure proceeds.

Several physical embodiments of the aforesaid and other inventive concepts are illustrated, by way of example only, in the accompanying drawings; it is to be understood, however, that the invention is limited in the embodiments which it can take, only by the scope of the sub-joined claims.

In said drawings,

Fig. 1 is a fragmentary side view of a primary and secondary conduit system incorporating the take-off connector of the present invention, parts thereof being shown in section;

Fig. 2 is a section on line 2—2 of Fig. 1, sighting in the direction of the arrows;

Fig. 3 is a section on line 3—3 of Fig. 1, sighting in the direction of the arrows;

Fig. 5 is a section on line 5—5 of Fig. 4, sighting in the direction of the arrows.

Figure 4:
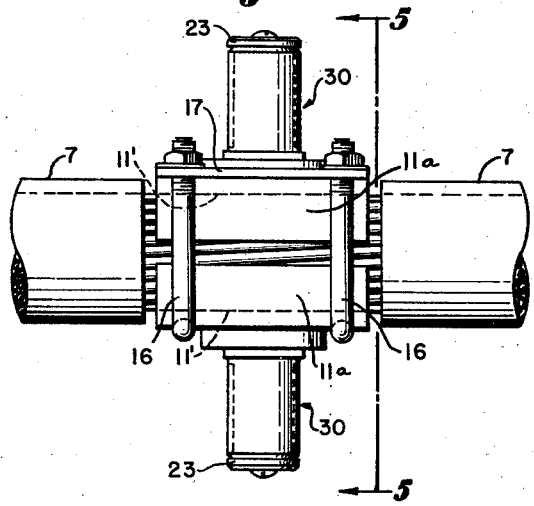
Fig. 4 is a fragmentary side elevation of another embodiment of the invention.

Referring to the constructions illustrated in the drawings, all the embodiments shown include means for securely engaging or clamping the connector to a feeder, such as a bus-bar or a main hydraulic line, at any desired point intermediate the ends of the primary conduit; means associated with the clamping means for leading away from the primary conduit, the particular kind of medium conducted thereby, and means carried by the last said means for releasably engaging at least one secondary conduit or take-off conduit. The means for engaging the primary conduit are preferably so constructed as to embrace same, and are clampingly but releasably engageable therearound. The means for entraining the medium from the primary conduit can be so constructed as to establish a connection with the secondary or take-off conduit in either a series-flow relationship or in a parallel-flow relationship. In either event, the means on the connector for engaging the take-off conduits or conductors are so constructed as to enable the ready and rapid plugging of the take-off conduits onto the connector body and to enable an equally facile disconnection of these take-offs. These same last-mentioned means are also so constructed as to establish an enhanced electrical contact or fluid-tight contact with the take-off conduits. The joint thereby established is secure and rigid and not susceptible to structural failure.

In the particular embodiment shown in Figs. 1-3 inclusive, the structure comprises a feeder conduit or bus-bar 7, here shown as an electric cable, connected by the connector device of the present invention in series-flow relationship with two secondary conduits or take-off cables 8. Each of the cables 8 is in series with the bus member 7, although together with the bus member they set up a series-parallel circuit.

The connecting device 9 includes a clamp portion 10, a suspending and conducting arm 13 integral with one of the halves of the clamp portion, and two terminals, each substantially identical to the one generally designated by the reference character A.

The clamp itself comprises two halves which are substantially identical except for the fact that the half 12 bears or is associated with the hanger 13. In other respects, the clamp halves are each constituted by a block, each having a cylindric trough 11' extending axially thereof for the full longitudinal extent of the block. These troughs have a radius of curvature that can be varied in stock lots to fit various sizes of bus members.

Each of the blocks 11 and 12 bears, on its outer periphery, two substantially identical semi-annular grooves 14. Each groove 14 is flanked on each side face of the block by two flanges or webs 15. Each groove is adapted to receive a recurved fastener element 16, here shown as a U-bolt, seated by its curved portion in the grooves in the member 12, and having its free ends projecting a certain extent above the top face of the associated block 11.

A plate 17, of a shape, and having dimensions, corresponding to the outer flat face of either the member 11 or the member 12 is mounted in this embodiment on the outer face of the member 11 in contacting parallelism therewith. The plate 17 has apertures 17' located at points adapted to register with and permit the passage of the upper ends of the U-bolts. The aforesaid parts are all assembled and clamped together surrounding the bus 7 by means of fastener elements 16'.

Each lateral face of the lower end of the arm 13 bears a post 18 projecting substantially perpendicularly therefrom in opposite directions. Each post 18 has its entire outer surface formed into a spirally inclined wedge 19. Fitting around each post in loose contact therewith, is a sleeve 20, the interior surface of which bears a complementarily spirally inclined wedge extending the entire length of the sleeve. Each sleeve 20 also bears diametrically opposed slots 21 therein, so formed and located as to render the sleeve expansible and contractable by the application of force.

The inner end, or arm-end, of each post bears a polygonal abutment 22, and the outer end of each post bears a preventer disc 23 for maintaining the sleeve 20 on the post against axial pulls which may be applied thereto in removing the take-off conduits.

Each of the take-off conduits 8 terminates in a limiter socket 8', whereby the take-off conduit is adapted to be plugged over the terminal and the sleeve 20, and turned or revolved to cause the sleeve 20 to reach upon the post 18 by virtue of the buttress action of the respectively engaged threads, whereby there will be set up a plurality of radially outwardly acting forces tending to cause the sleeve to expand radially into secure and rigid and immobilizing contact with the interior surface of the socket 8'. This contact is established throughout the entire length and circumference of the engaging members 20 and 8' in such a manner that equal force is exerted against the member 8' in every equal area thereof, and not, as heretofore the case, merely at one end or in restricted locations of both members. There is thereby established not only a secure and strong connection between the member 8 and the bus 7, but by virtue of the augmented pressure exertable by this combination of parts, a superior electrical connection over a large area is established, thereby decreasing the electrical resistance for a connection of a given wattage.

The embodiment shown in Figs. 4 and 5 is illustrated as including substantially the same clamping parts and arrangement thereof for detachably attaching the connector to a bus or feeder, but in this modification each of the blocks is identical, each bearing a terminal 30, each of which is identical to the other terminal. The terminals 30 are constructed and function in a manner identical with that described with the terminals of Fig. 1. They extend substantially perpendicularly from opposite outer faces of the clamp portion of the connector, and thus establish a structural arrangement whereby take-off conduits similar to those indicated in Fig. 1 may be plugged onto the terminals 30. The circuit thus established will, in this instance, be of a parallel-flow nature, instead of the series-parallel flow relationship established by the construction in Fig. 1.

The construction of both embodiments provides a quick and positive instrumentality for making or breaking a connection to the bus. The take-off conduits may be connected to the bus by a positive grip, self-wiping, fast-acting connection. In case it is desired to establish the take-off circuit as a permanent one, it is only necessary to apply excessive torque to the members 8 and 8', as by means of an ordinary wrench. In this event, the co-acting threads will be jammed and "frozen" together by this action, in such a manner that the take-off conduits will be immobilized.

A noteworthy feature of the electrical connectors hereinabove described is the fact that most of the separate parts of the embodiment illustrated in Figs. 1–3 inclusive, and all of the parts illustrated in Figs. 4 and 5, are completely interchangeable with each other without necessitating the slightest alteration in dimensions or in shape of any of the parts and without any preparatory treatment whatever. That is to say, the members 11a of Fig. 4 may be respectively shaped and positioned, as may the members 16, so as to be reversible, the expansion plate 17 accompanying the shifted parts to their new position. The terminals 30 being identical in every respect, reversing the blocks 11a has no effect upon the adaptability of the connector.

In connection with the embodiment shown in Fig. 1, unless it is absolutely essential that the take-off conduits 8 be suspended under the bus 7, in the exact position shown, the member 12 can satisfactorily be reversed into the position occupied by the member 11, which can then be put upon the bottom of the bus. The fastener 16 may also be inverted, along with the expansion plate 17 and the fastener 16'. The terminals A being identical in construction, take-off conduits may be plugged onto them in their new location above the bus 7 and secured thereto in the same manner as hereinbefore described.

Figure 6:
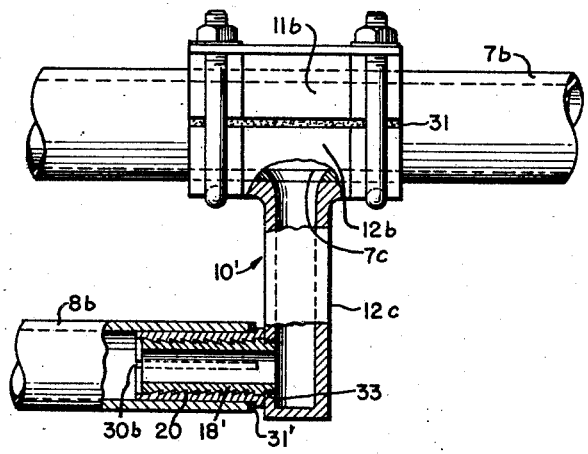
Fig. 6 is a fragmentary side elevation of still another embodiment of the invention.

Although the invention has been described with particular reference to connecting electrical take-off conductors to an electric bus, the principle of the invention may be equally well incorporated in hydraulic systems, involving the connection of an hydraulic take-off pipe to an hydraulic feeder pipe, as illustrated in Fig. 6. In this form of the invention, an hydraulic feeder line 7b, having a suitable outlet 7c therein, is connected to a take-off hydraulic pipe 8b by means of a connector 10′ similar in essence to the one illustrated in Fig. 1. This hydraulic connector comprises a block 11b constructed substantially the same as the block 11 of Fig. 1 clamped to the pipe 7b and to a complementary block 12b in substantially the same manner as is the aforesaid connector, but including a gasket or other packing instrumentality 31 suitably located between the contacting faces of the blocks to effectuate fluid-tight tightness of the blocks. The block 12b bears a depending arm 12c in the form of a dead-ended pipe or tube, having an aperture 33 near its lower end, threaded to receive a connector group somewhat similar to the connector group A of Fig. 1. In this embodiment however, the post 18′ is hollow, but is otherwise constructed the same as the post 18. The sleeve 20 however, may be identical with the sleeve 20 in Fig. 1, with a slot 30b.

To establish a fluid-tight take-off connection, the pipe 8b, which may be packed to the terminal and connector either by a packing 31′ on the terminal or by packing means on the end of the pipe, is merely fitted over the terminal and rotated a sufficient angular amount to set up the radially outwardly expanding action of the sleeve 20 thereagainst, applying such additional torque however as may be necessary to insure a fluid-tight connection, if the conducted medium is a limpid high-pressure fluid.

I claim:

1. A device for disconnectibly joining a secondary conduit to a primary conduit that has an outlet for the conducted medium, including: means comprising a plurality of blocks adapted for releasable engagement with the primary conduit around said outlet; means integral with one of the blocks of the engaging means for entraining said medium away from the primary conduit; and means carried by the last said means and including a part integral therewith and a part movable on the first part for releasably engaging a secondary conduit.

2. A device for disconnectibly joining a secondary conduit to a primary conduit that has an outlet for the conducted medium, including: means comprising a plurality of blocks for releasably and reversibly clamping the primary conduit around said outlet; means integral with one of the blocks of the clamping means for entraining said medium away from the primary conduit at substantially a right angle thereto; and means, including a part integral with one block and a part movably mounted on the first part, carried by the last said means for releasably engaging a secondary conduit.

3. A device for disconnectibly joining a secondary conduit, having an internally engageable cylindrical surface, to a cylindrical primary conduit that has an outlet for the conducted medium, including: means adapted for releasable engagement with the primary conduit around said outlet; means on the engaging means for entraining said medium away from the primary conduit; and means including a part having an exterior cylindrical surface carried by the last said means for releasably engaging the interior surface of said secondary conduit.

4. A device for disconnectibly joining a secondary conduit to a primary conduit that has an outlet for the conducted medium, including: means adapted for releasable engagement with the primary conduit around said outlet; means on the engaging means for entraining said medium away from the primary conduit; and means carried by the last said means for releasably engaging at least one secondary conduit, said means for engaging the secondary conduit including a male member having a spiral wedge on its exterior surface and carrying a longitudinally slotted sleeve-like member having a complementary spiral wedge on its contacted interior surface.

5. A device for disconnectibly joining a secondary conduit to a primary conduit that has an outlet for the conducted medium, including: means adapted for releasable engagement with the primary conduit around said outlet; means on the engaging means for entraining said medium away from the primary conduit; and means carried by the last said means for releasably engaging at least one secondary conduit, said means for engaging the secondary conduit including a male member having a spiral wedge on its exterior surface and carrying a longitudinally slotted sleeve-like member having a complementary spiral wedge on its contacted interior surface, the inner end of said sleeve bearing a flange adapted to be abutted against the adjacent portion of the device to effectuate outward radial expansion of said sleeve member against said secondary conduit.

6. In a device for connecting secondary conduits to a primary conduit intermediate the ends of said primary conduit: a clamp for enclosingly engaging the periphery of a portion of the length of the primary conduit and including identical halves each having an inner semi-cylindrical surface; semi-annular troughs on the outer surface of each half; return bend fasteners having a portion thereof seated in the troughs in one of the halves and having their ends protruding beyond the exterior face of the other half, and releasable anchoring means on said ends, the clamp halves, fasteners, and anchoring means being reversibly and interchangeably shaped and located with respect to said primary conduit.

7. In a device for connecting secondary conduits to a primary conduit intermediate the ends of said primary conduit: a clamp for enclosing the periphery of a portion of the length of the primary conduit and including identical halves each having an inner semi-cylindrical surface; semi-annular troughs on the outer surface of each half; return bend fasteners having a portion thereof seated in the troughs in one of the halves and having their ends protruding beyond the exterior face of one of said halves; a plate on said exterior face of said clamp half; said plate having respective apertures therein in registry with the respective ends of the fastening means; and releasable anchoring means on the ends of said fastening means.

8. A device for disconnectibly connecting a secondary conduit in series flow relationship with a primary conduit that includes a flow outlet area, including: means including a pair of like blocks for attachment to said area to establish flow therefrom; means integral with one block for directing flow from the attachment means at an angle greater than an acute angle and less than an obtuse angle; and a terminal integral with and projecting at an angle from the last said means, said terminal including an external thread having threaded thereon an expansible sleeve with an externally cylindrical surface for releasably gripping the interior of said secondary conduit and holding same in series flow relationship with the primary conduit.

9. A device for disconnectibly connecting a plurality of conduits in series-parallel or parallel-flow relationship with a primary conduit that includes a flow outlet area, including: means for attachment to said area to establish flow therefrom; and terminal means projecting substantially at right angles from said attachment means, each of said terminal means including means integral with parts of the attachment means and carrying an expansible device for releasably gripping the interior of a secondary conduit and holding same in series-parallel or parallel-flow relation to said primary conduit.

10. A device for disconnectibly joining a secondary conduit to a primary conduit that has an outlet for the conducted medium, including: means adapted for releasable engagement with the primary conduit around said outlet; means on the engaging means for entraining said medium away from the primary conduit; and means carried by the last said means for releasably engaging a secondary conduit; said means for engaging said secondary conduit including a male member having a series of exterior annular wedging surfaces disposed along its exterior surface and carrying a longitudinal slotted sleeve-like member having complementary interior annular wedging surfaces disposed along its contacted interior surface.

CHARLES O. MORRIS.

REFERENCES CITED

The following references are of record in the file of this patent:

UNITED STATES PATENTS

| Number | Name | Date |
|---|---|---|
| 1,162,595 | Forgey | Nov. 30, 1915 |
| 589,216 | McKee | Aug. 31, 1897 |
| 1,570,887 | Graves | Jan. 26, 1926 |
| 615,767 | Wade | Dec. 13, 1898 |
| 1,459,030 | Mueller | June 19, 1923 |